(12) United States Patent
Pierce

(10) Patent No.: US 10,948,929 B1
(45) Date of Patent: Mar. 16, 2021

(54) BUILDING UTILITY FLOODWATER ISOLATION SYSTEM

(71) Applicant: David A. Pierce, Corpus Christi, TX (US)

(72) Inventor: David A. Pierce, Corpus Christi, TX (US)

(73) Assignee: Utility Isolation Systems LLC, Frisco, TX (US)

( * ) Notice: Subject to any disclaimer, the term of this patent is extended or adjusted under 35 U.S.C. 154(b) by 0 days.

(21) Appl. No.: 16/800,453

(22) Filed: Feb. 25, 2020

Related U.S. Application Data

(60) Provisional application No. 62/810,713, filed on Feb. 26, 2019.

(51) Int. Cl.
*F16K 31/02* (2006.01)
*G05D 7/06* (2006.01)
(Continued)

(52) U.S. Cl.
CPC ........... *G05D 7/0635* (2013.01); *E03B 7/071* (2013.01); *E03F 7/02* (2013.01); *G01F 23/00* (2013.01); *H01H 47/00* (2013.01)

(58) Field of Classification Search
CPC ......... G05D 7/0635; E03B 7/071; E03B 7/08; E03B 7/077; E03B 11/02; G01F 23/00; G01F 23/0038; H01H 47/00; E03F 7/02
(Continued)

(56) References Cited

U.S. PATENT DOCUMENTS

| 1,453,743 | A | * | 5/1923 | Bruce | ................... E03F 5/0407 |
| | | | | | 210/119 |
| 4,036,173 | A | | 7/1977 | Nicklas | |

(Continued)

FOREIGN PATENT DOCUMENTS

| CN | 204898605 U | 12/2015 | |
| DE | 10258554 A1 | 7/2004 | |
| GB | 2480885 A * | 12/2011 | ................ E03F 7/04 |

*Primary Examiner* — Minh Q Le
(74) *Attorney, Agent, or Firm* — M. Susan Spiering; Ochoa & Associates, P.C.

(57) ABSTRACT

Disclosed herein is a utility isolation system designed for residential, commercial and industrial usage. The system comprises a bidirectional valve connected to a sewer line which valve responds to a change in the level of a body of water. The system prevents high water levels from entering municipality's sewer infrastructure systems. The isolation system monitors levels of a body of water and also prevents releases from hazardous sewer waste entering rivers, lakes, and coastal waterways. The isolation system provides protections from waste water back flowing into homes and buildings, and causing electrical shorts, or natural gas releases, and blocks potable water lines from filling plumbing devices with open drains such as lavatories and toilets during a high water level event. The system can be remotely activated and monitored by a user, a government office, or service provider via SCADA (Supervisory Control and Data Acquisition) or like system. The isolation system's objective is to also promote development in low lying areas that were once denied. The system can also improve a municipality's compliance with EPA issues, and allows for service interrupts from government agencies due to, or for example, non-payment of services, evacuations, contamination of potable water supplies, fire, and or other disasters.

10 Claims, 2 Drawing Sheets

(51) Int. Cl.
  *E03B 7/07* (2006.01)
  *E03F 7/02* (2006.01)
  *H01H 47/00* (2006.01)
  *G01F 23/00* (2006.01)

(58) Field of Classification Search
  USPC ....... 137/487.5, 496, 497, 498, 247, 247.15;
  251/129.01; 210/170.08
  See application file for complete search history.

(56) References Cited

U.S. PATENT DOCUMENTS

| | | | |
|---|---|---|---|
| 4,335,677 A | 6/1982 | Nagata | |
| 4,891,115 A | 1/1990 | Shishkin | |
| 4,936,350 A * | 6/1990 | Huber | E03F 7/02 137/68.19 |
| 5,209,254 A * | 5/1993 | Ancselovics | E03C 1/00 137/357 |
| 5,419,359 A * | 5/1995 | Kor | E03F 5/0402 137/247.15 |
| 5,826,609 A * | 10/1998 | Watts | E03F 5/02 137/15.17 |
| 6,193,879 B1 | 2/2001 | Bowman | |
| 6,997,201 B2 * | 2/2006 | Preul | E03F 7/02 137/1 |
| 9,123,230 B2 * | 9/2015 | Rogers | G01F 23/0007 |
| 2001/0003286 A1 * | 6/2001 | Philippbar | G01M 3/243 137/624.12 |
| 2004/0003855 A1 * | 1/2004 | Dees | F16L 55/134 138/93 |
| 2004/0197922 A1 * | 10/2004 | Cooper | G01N 33/18 436/52 |
| 2005/0103363 A1 * | 5/2005 | Roles, Jr. | E03F 5/14 134/56 R |
| 2007/0028970 A1 * | 2/2007 | Proulx, Jr. | F16K 15/03 137/613 |
| 2007/0257218 A1 * | 11/2007 | Bood | E03F 5/042 251/12 |
| 2009/0314351 A1 * | 12/2009 | McDonald | E03B 7/071 137/2 |
| 2010/0263729 A1 * | 10/2010 | Khonkar | F16K 31/0644 137/1 |
| 2011/0073189 A1 * | 3/2011 | Elbert | G04C 23/46 137/1 |
| 2011/0226800 A1 * | 9/2011 | Lips | G05D 7/0623 222/1 |
| 2012/0048386 A1 * | 3/2012 | Clark | E03B 9/04 137/2 |
| 2015/0247584 A1 * | 9/2015 | Singley | E03B 7/071 251/69 |
| 2016/0083953 A1 * | 3/2016 | Caux | F16K 7/10 137/2 |
| 2017/0159268 A1 * | 6/2017 | Chevalier | E03B 7/071 |
| 2018/0143047 A1 * | 5/2018 | Gal | G05D 7/0635 |

* cited by examiner

BUILDING UTILITY FLOODWATER ISOLATION SYSTEM

CROSS REFERENCE TO RELATED APPLICATION(S)

This is a non-provisional patent application, filed on an accelerated basis, based on U.S. Provisional Patent Application Ser. No. 62/810,713 previously titled "Building Utility Piping Floodwater Isolation System", filed on Feb. 26, 2019, the priority of which is hereby claimed and the disclosure of which is incorporated herein by reference in its entirety.

FIELD OF THE INVENTION

The present invention relates to isolation of utilities servicing a residential, commercial, or industrial facility inclusive of its sewer, gas, and electrical services for the prevention of ingress of floodwaters into the public sewer and the backflow of sewage into the facility.

BACKGROUND OF THE INVENTION

In low lying areas prone to flooding, large volumes of floodwater may enter public sewer systems through floor drains, toilets, and open lines causing a supercharged condition and placing extra demands on the waste water treatment plants. Additional, when sewer systems become supercharged, a backflow condition can result in the discharge of sewer through a facilities drains and toilets resulting in property damages due to water and unsanitary sewer contamination. If the facility is in a low lying area, the sewer discharge may be directed to public or private waterways and lands which will become contaminated. Due to the potential of contamination in these areas the Environmental Protection Agency (EPA) has mandates and regulation to prevent this type of contamination. Failure to comply with the EPA mandates and regulations may result in decrees, fines, and other legal actions against municipalities who are not in compliance. As a result, municipalities have developed codes restricting the development of properties with sewer connections which are below the base flood elevation (BFE).

There are backflow preventing valves commonly used in sewer lines, but there is no known system which prevents the ingress of flood waters into the sewer systems. It is desirable to have a bi-directional isolation system which can isolate the sewer system during high water (High water herein is defined as "the state of tide when the water rises to its highest level in coastal areas, rivers, and lakes) or floodwater events to prevent both the ingress of floodwater into sewer systems and backflow of sewer at a given facility. If such a system were available, the development of properties at or below BFE could be allowed and existing grandfathered properties could be retrofitted with such a system bringing them into compliance with EPA regulations. With such a system, facilities including public restrooms, restaurants, homes, businesses, RV parks, public parks and venues could be allowed to develop along waterways such as beaches, lakes, rivers, or other flood prone areas. As used herein bi-directional means a valve which will block flow in either direction, or also deemed a bi-directional block valve.

Systems for preventing floodwater contamination in building structures have been a concern for years. Various methods have been tried to prevent floodwater ingress in cities and/or building structures. For example, DE 10258554A1 describes a system for preventing or restricting floodwater comprising a tube system arranged in the region of each bank of a river in the form of a fast lane in which part of the water flows at a faster rate. This reference provides a system to deal with floodwaters at the river level. Other methods to control flood waters include levies or dams. The present invention does not deal with controlling the water level of natural water medias, but prevention of the floodwaters from ingress into the sewer system.

When dealing with structures in municipalities, one needs to consider the effect of the water level on the infrastructure piping, such as sewer and utility piping. Often the water level in rivers, lakes, etc. and tidal areas will rise and cause backflow into the sewer lines depending on the piping arrangement in buildings. As mentioned, the water and sewage may backflow into the building through the plumbing devices within a facility which have a drain line of some type.

Intelligent flood prevention baffle systems are known (e.g. CN 204898605U) which introduce water level monitoring systems having automatic operations for opening and closing of plates. GB 2383342A describes a line valve for use in preventing backflow and serving as a floodwater/sewage protection system for buildings. Clogging of valves with solids or semi-solids from sewage mixture trapped in the lines is often a concern.

An objective of the present invention is to prevent bi-directional flow during flooding or high water events. The present invention protects municipality's sewer system infrastructure from the ingress of floodwater and backflow of sewage into the structure through the building's plumbing devices, hereinafter defined as items containing open floor drains or open sewer drains, such as toilets, sinks, bathtubs, showers, equipment and appliance drains, and the like. Examples of equipment include ice machine and appliances such as washing machines.

Many references discuss systems for floodwater prevention or backflow of sewage protection. No information has been identified for a system which address the bi-directional control of flow in sewer lines for the prevention of floodwater ingress and backflow of sewage. A need continues to exist for a system which addresses these issues within present building standards.

Other aspects and advantages of the present invention are described in the detailed description below and in the claims.

SUMMARY OF THE INVENTION

Disclosed herein is a sewer isolation system for isolating sewer line services to a facility having at least one floor at ground level, comprising:
 a. at least one level transmitter (100) installed over a body of water that is capable of transmitting a signal to a level indicating controller station (110), said level indicating controller station further comprising a predetermined setpoint, at least one means (101) to send a signal to at least one bidirectional sewer control valve (160), which bidirectional sewer control valve is capable of actuation and shall remain open when the body of water is below the predetermined setpoint;
 b. upon the level of the body of water reaching above the setpoint, the bi-directional valve is closed thus isolating the sewer line service to the facility and having a closed sewer line;
 c. upon return of the level below the setpoint for the body of water, the bi-directional valve will open, thus removing isolation of the sewer line.

An objective of the isolation system is to prevent ingress of floodwaters to the sewer line, while also preventing backflow of sewage into the facility. The sewer isolation system, also defined as actuation unit, further comprises an automatic local or remote actuation unit but can optionally comprise a local manual actuation unit. The isolation system may be below or above base flood elevation level of the facility. While the isolation system is discussed relative to high waters, or flood like conditions, the isolation system may also be used under low water conditions. Low water conditions is defined herein as the level in a body of water at or below the predetermined setpoint. The bi-directional valve tied to the sewer line is capable of operation under low or high water level conditions. The predetermined setpoint is about 3" below the ground floor of the facility. The level below the predetermined setpoint for the body of water is anything greater than the setpoint of about 3.0" and could for example be about 3.1" to about 9" below the ground floor of the facility. However, the higher limit can be greater than 9".

Facility is defined herein as residential, commercial, industrial or public construction. The inventive system may be operated automatically or manually. Described is an automated system for ease of description. Manual systems are considered within the scope of the invention. A level controller containing a communication card, which reacts to water levels will activate automatically and open or close the bi-directional valve as appropriate, based on a reading indicating the level of water being monitored. Upon a high level of water (predetermined setpoint for monitoring), or a flood or flood-like event, bi-directional valves within the sewer line will be closed to avoid sewage from entering the building through the plumbing devices and to prevent floodwaters from entering the sewer system. The pipes for the plumbing devices typically are in horizontal or near horizontal position, and underground. The inventive system can withstand the pressure and forces associated with flooding conditions, often up to about 20 psi or greater, without distortion, dislocation, or leakage, generally for weeks at a time. It is not uncommon in flood conditions for rivers to overflow as much as 40 feet above normal.

In addition for use with sewer lines, the utility isolation system disclosed is also usable for isolation of domestic water, electrical systems, and natural gas systems. The inventive isolation system may be used in conjunction with private or public emergency notification assemblies, and may be used to interrupt service from agencies due to non-payment, contamination of domestic water supply, emergency ordered evacuation, or other reasons needing closure of service.

BRIEF DESCRIPTION OF THE DRAWINGS

The invention is described in detail below with reference to the appended drawings, wherein like numerals designate similar parts. In the Figures.

DETAILED DESCRIPTION OF THE INVENTION

Figure 1:
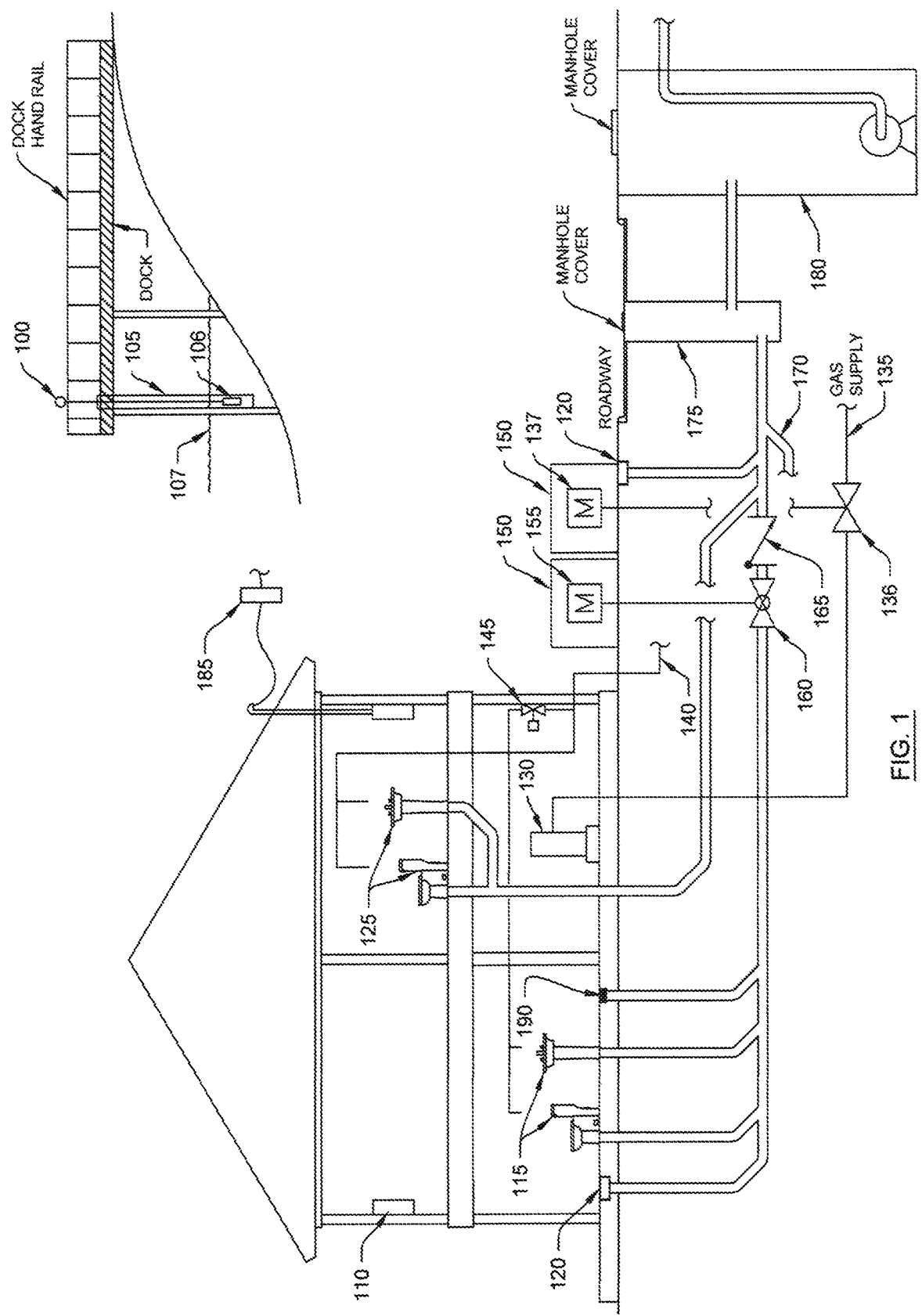
FIG. 1 illustrates a system elevation schematic of a sewer piping system between a subject facility to a sewer lift station.

The invention is described in detail below with reference to several embodiments. Such discussion is for purposes of illustration only. Modifications to particular embodiments or examples are within the spirit and scope of the present invention, set forth in the appended claims, and will be readily apparent to one of skill in the art. Terminology used herein is given its ordinary meaning consistent with the exemplary definitions set forth immediately below. With respect to the various ranges set forth herein, any upper limit recited may be combined with any lower limit for selected sub-ranges.

A sewer isolation system comprising a bidirectional valve connected to a sewer line which valve responds to a change in the level of a body of water is disclosed. The bi-directional valve is generally maintained open, unless a high water level event is about to occur, and the bi-directional valve will be closed to avoid damage to a facility or the environment. The monitoring of a body of water which affects the facility (or facilities since more than one facility can be tied to the monitoring of a body of water) is maintained continuously. The bi-directional valve is set for an open position provided the level of the body of water is at a predetermined setpoint. Generally, "predetermined setpoints" are determined by a governmental authority having jurisdiction (AHJ) and can vary depending on geography or municipality; optionally the isolation system may be actuated upon AHJ discretion, thus isolating the sewer lines during non-flood conditions. Examples of non-flood conditions warranting closure of the bi-directional valve include non-payment of services, contamination of water, releases of water affecting the level of the body of water monitored, and the like. When the water levels return below the predetermined setpoint level, the bidirectional valve will open removing isolation of the sewer line. The utility isolation system is useful to prevent ingress of floodwaters, prevent backflow of sewage into the facility, allow local or remote automatic actuation upon predetermined setpoint level(s), allow for local manual actuation, allow for the system to be below or above BFE ("Base Flood Elevation"), and can if the need arises, be actuated in the absence of a flood conditions (i.e., for discretionary reasons by an AHJ, or service provider).

The utility isolation system of the present invention may also embody a domestic water isolation valve for isolating domestic water line services to a facility, under all the reasons (or others) as mentioned above, with flood conditions being the most likely cause for closure of the domestic water service line.

An alternate embodiment includes an electrical power isolation system for isolating electrical power line services to a facility having at least one floor at ground level, comprising: (a) at least one level transmitter (100) installed over a body of water that is capable of transmitting a signal to a level indicating controller station (110), said level indicating controller station further comprising a predetermined setpoint, at least one means (101) to send a signal to at least one electrical contactor (185), which contactor (185) is capable of actuation and shall remain closed when the body of water is below the predetermined setpoint; (b) upon the level of the body of water reaching a level above the setpoint, the contactor is open thus isolating the electrical service line; and (c) upon return of the level below the setpoint for the body of water, the contactor will close, thus removing isolation of the electrical service line. The electrical-based isolation system further comprises an automatic local or remote actuation unit. The isolation system may also be manually actuated, and is generally located above BFE. The isolation system may optionally be operated in the absence of high water conditions and at the discretion of an AHJ. This electrically directed embodiment is useful for the prevention of fires, and electrical hazards, allows for manual, and/or local or remote automatic actuation upon a predetermined level.

A specific embodiment involves a gas isolation system for isolating natural gas services to a facility under high waters or flood conditions, wherein the system is constructed much like the electrical service embodiment above, however installed on a gas service pipeline that services a facility subject to flooding. Like the electrical service embodiment, the gas services embodiment is generally opened, and is actuated closed upon detection of a predetermined floodwater level, thus isolating the gas service during flood conditions. The bi-directional valve will open upon return of water levels below the predetermined setpoint level, thus returning gas service to the facility. The gas service embodiment described is useful for the prevention of gas related hazards, and can be actuated locally or remotely, and either automatically or manually. The pipeline may be installed below or above the BFE, and the system may be actuated (or isolated) even in the absence of a flood conditions. Again, the closure of the gas service is at the discretion of an AHJ.

The utility service isolation system can be monitored remotely and activated by a third party user, such as a utility company, government entity, or service provider via multimedia systems such as an Emergency Broadcast or SCADA (Supervisory Control and Data Acquisition) system.

The present inventive system is generally located below the base flood elevation (BFE) level as determined by the governing authority. More generally, the inventive system would be located in flood prone areas, coastal areas, rivers, basements, low lying areas protected by levee's and the like.

The sewer control valve is located below grade on the drain piping, usually about 2'-6', preferably about 2'-4' (feet) outside of the building footprint. The domestic water supply control valve is in an area of the building protected from rising floodwater and damage from flood debris, on the service water piping before any plumbing devices.

The drainage pipes for the invention are usually set by local construction codes, and generally are 24" to 36" below grade. The grade could be above water levels by as little as 18" (inches). Generally the sewer piping is owned by the property owner until it leaves the property line. In FIG. 1, the sewer line is shown as a sealed system, below the floodwater level. As used herein, a flood is an event causing an overflow of water onto land; "floodwater" is intended to mean levels of water which an AHJ specifies or determines is an elevation subject to or prone to overflow of water onto usually dry land, and generally deemed a floodwater zone.

Whereas during flood events local municipalities suffer supercharging of their sewer lift stations due to the infiltration (or entry) of floodwaters. This infiltration overloads the lift station or treatment plants thus creating overflow of effluent into waterways. The inventive system protects the sewer system from this flood event and also protects the building from sewage contamination. The valve for the inventive system is designed to operate or actuate, below ground level, and at the present time, this type of valve actuation for this purpose is not done or heard of.

While gate, globe, and other types of valves are known for sewer systems, or in sewer utility lines, the present invention uses an actuated bi-directional valve, for example an electrically (or other type of powered) actuated, fully ported, ball valve, controlled by a level transmitter/controller, a SCADA system or other data acquisition system. The inventive system can also use other types of valves within the municipality's sewer system infrastructure to prevent contamination of lands and waterways due to a line break. The utility isolation system can be activated automatically by rising flood waters or remotely from supervisory locations. The system prevents floodwaters from entering the sewer lines potentially compromising the sewer systems processing capacity and the release of untreated sewage impacting the environment. These releases were noted in hurricane Harvey in 2017. The inventive sewer isolation valve serves a dual purpose by protecting the building from raw sewage backing into the drain piping and entering the building through floor drains and the toilet overflow, and protects the municipality's sewer system infrastructure from ingress of floodwaters.

Presently, municipalities restrict development in areas below BFE. This restriction prevents a sewer lift station from being overwhelmed resulting in a release into the environment during a flood. This invention allows development in areas below the BFE. An isolation or bi-directional valve operated below ground is currently unheard of in this type of system. This invention allows municipalities to install this system on "Grandfathered" facilities thus bringing the integrity back to the sewer system, lift stations, and treatment plants.

The problem being addressed herein by the present invention is thus the releases of sewage into buildings as well as rivers, lakes, coastal waterways, failures of sewer system infrastructures, and loss of revenues due to the restrictions placed on properties below the BFE. The inventive utility isolation system permits the normal use of restrooms for the area of a building below the base flood elevation. However, by flood proofing the restrooms sewer drain piping, and isolating the plumbing service piping during flood events, the system protects the utility drain piping from floodwater entering the system and protects the building from raw sewage backing up and flooding the building.

One of the current solutions for the present problem involves restricting essentially all development on properties below the BFE. The current practice and governmental codes require use of the floor below the base flood elevation (BFE) for parking, limited storage or building access. This practice tends to limit the complete utilization of a buildings' total square footage and requires that water closets (or bath rooms) be located at elevations above BFE.

An objective of the present invention is to isolate the sewer piping to prevent floodwaters from entering the sealed sewer systems and at the same time protect the building from backflow of the sewer into the facility. This is different than the art, or what is currently performed, because an isolation device has never been applied to a sewer system.

Figure 2:
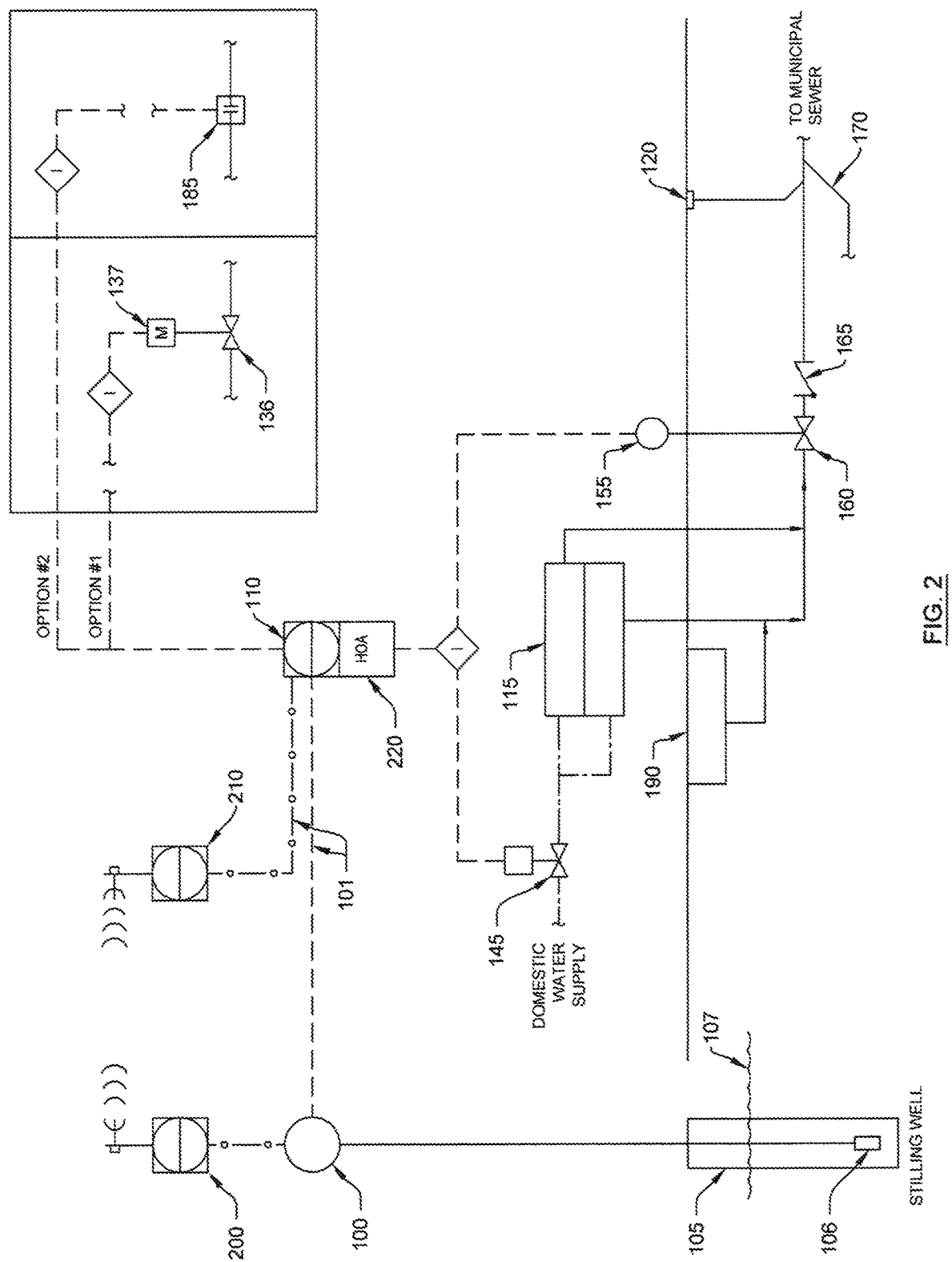
FIG. 2 illustrates a process and instrumentation diagram of the inventive system.

The figures or drawings depict a building with points of water entry and management thereof, as well as considering the water entry relative to the elevation of the lowest floor. Two drawings (FIG. 1 and FIG. 2) are provided to describe the inventive utility isolation systems' functions. FIG. 1 illustrates a system elevation schematic outlining the typical sewer piping system between a subject facility to a sewer lift station. The body of water being monitored is at a remote location relative to the house, and is shown in the upper right corner of FIG. 1 with the monitoring equipment. FIG. 2 provides a Process and Instrumentation Diagram (P&ID) of the inventive utility isolation system using standard ISA (International Society of America) symbology.

The number items are as follows:
As found in FIG. 1:
100. Level Transmitter
105. Stilling Well
106. Level Sensor
107. Body of Water
110. Level Indicating Controller Station 115. Toilet/Lavatory/Below BFE
120. Sewer Line Clean Out
125. Toilet/Lavatory/Above BFE
130. Gas Service Equipment
135. Natural Gas Supply
136. Natural Gas Control Valve
137. Natural Gas Control Valve Actuator
140. Domestic Water Supply
145. Domestic Water Supply Control Valve
150. Actuator Cage
155. Sewer Control Valve Actuator
160. Bi-directional Sewer Control Valve
165. Backwater Valve
170. Other Facilities
175. Sewer Collection Manhole
180. Sewer Lift Station
185. Electrical Utility Supply Contactor
190. Floor Drain
  FIG. 2 items:
100. Level Transmitter
101. Signal, as depicted by dotted line
105. Stilling Well
106. Level Sensor
110. Level Indicating Controller Station
115. Toilet/Lavatory/Below BFE
120. Sewer Line Clean Out
136. Natural Gas Control Valve
137. Natural Gas Control Valve Actuator
145. Domestic Water Supply Control Valve
155. Sewer Control Valve Actuator
160. Bi-directional Sewer Control Valve
165. Backwater Valve
170. Other Facilities
185. Electrical Utility Supply Contactor
190. Floor Drain
200. Remote SCADA Level Transmitter (Optional)
210. Remote SCADA Level Receiver (Optional)
220. Local controls (Hand Off Automatic ("HOA"))

The inventive utility isolation system is shown in FIG. 1, comprises a level controller (FIG. 1, 110) that receives a high level signal from a level transmitter (FIG. 1, 100) and responds by activating the bi-directional isolation valves (FIG. 1, 160) which close the sewer line exiting the facility. The facility domestic water supply (FIG. 1, 140) will also be blocked by closing of the domestic water supply control valve (FIG. 1, 145). The sewer utilities are isolated from flood waters and the building is also protected from backflow of sewage and associated debris. The domestic water supply to toilet and lavatories (115) is isolated to prevent over flow conditions in the event the domestic water is used while the sewer line is isolated (blocked in or in closed position). The closure of the bi-directional valve will occur when a flood or flood-like condition occurs raising the water levels to the facility. When the body of water is below setpoint the domestic water supply control valve is open. When the level of the body of water is above setpoint, the bi-directional valve will close, thus isolating the domestic water supply. After the water level recedes and returns to below the setpoint, the bi-directional valve will open; thus, returning the domestic water supply back to service.

Additional utility services may be controlled by the control system. Two embodiments are depicted in the figures, electrical (FIG. 2, option 2) and gas (FIG. 2, option 1) supplies, but other similar services may be incorporated. An electrical contactor (FIG. 1,185) installed on the facilities electrical supply or a branch circuit of the supply can be operated by the controller (110) The addition of a valve on the facility gas supply (136), may also be actuated to close and block in gas supply to the affected facility during flood or emergency conditions.

The signal from the level transmitter (FIG. 1, 100, FIG. 2, 100) may be local to the facility, remote to the facility, or a signal provided via communication to the controller from a third party. The remote controls (FIG. 2, 200, 210) are depicted by items in FIG. 2. Third parties could include a municipality, government agency, AHJ, or independent system operator.

As an additional optional protection, the back water valve (FIG. 1,165) maybe installed to protect the facility from sewage backflow if the sewer system becomes supercharged due to non-flood conditions as the facility may be located at elevations lower than the highest level of sewer man-holes (FIG. 1, 175) and sewer lift stations (FIG. 1, 180).

A manual operation is established by installation of control buttons or switches (FIG. 2, 220) which override the automation and remote signals to set the system in a desired configuration, opened or closed, or manual off or automatic mode.

A. Process

The present invention is a system comprising a control system, collection of valves, level transmitters, signal transmitters, status feedback indicators, receivers, and wiring assembled and operated in such a manner to isolate building fresh water and sanitary sewer piping located in flood prone locations to prevent ingress of floodwater into the sewer systems and the backflow of sewage into a facility. Such events may compromise the local waste water treatment system (or lift station) capacity and lead to the accidental or unintended release of raw sewer waste into the public or private lands and/or water ways. These type of releases generally trigger a negative impact to the environment. In a distributive control application the local utilities, AHJ, or municipalities may monitor and control the isolation valves from remote supervisory locations utilizing SCADA systems.

The process is triggered when the level indicating controller station receives a signal from the level transmitter that the water level of the body of water monitored (107) is above a high level setpoint, upon which the valves (160, 145) shut to protect the flow of floodwater into the plumbing devices. It also prevents the flow of sewage and wastewater back into a building. Once water levels of the body of water monitored have subsided to normal levels, the controller will allow the system to be reset and the isolation valve on the sewer line (160) and domestic water supply will open allowing normal operation. If optional control features are provided on the electrical supply and gas supply, these devices may also be reset.

B. System Components and Operation Thereof

1. Level Transmitter

The level transmitter (FIG. 1, 100) measures the height of the water body (107) of the flood source. This device is located on sight or at a remote location and sends a signal to the controller (FIG. 1, 110) of a high-water level event. A high water level event alarm can be set for the floodwater level, typically 3"-9", preferably 4"-7", and most preferably 3"-6" (inches) below the elevation of the first floor grade. The high water event signal may also be sent from a remote location to activate the system and operate the control valves. The AHJ or local authority may send this signal when an evacuation order is issued or for other emergency and environmental protective reason.

2. Sewer Control Valve (FIG. 1, 160). This valve (160) is typically an electrically actuated controlled PVC ball valve sized to the sewer piping (typically 4"-12" is considered Nominal Pipe Size or NPS). This valve has dual purposes, isolating the sewer system from floodwaters entering the floor drains, toilets, and lavatories during flood conditions and protecting the building from sewage backflows. The valve is controlled by the signal from the system controller. This control valve is often located below grade in a valve box or direct buried in the earth, on the building sewer discharge piping typically about two (2') to eight (8') feet from the building at about 2' to 4' (feet) deep. This valve operates opened and fails closed upon loss of power or control signal. This valve is not limited to isolation of sewage, but its closure and line isolation can also serve as protection against contamination of lands and waterways in the event of sewer line breaks in a municipality's sewer system infrastructure.

3. Fresh Water Control Valve (FIG. 1, 145). This is typically an electronically actuated solenoid controlled valve sized to the building's fresh water supply, typically ¾" to 1½". Commercial and industrial building valves may be as large as 12". The purpose of this valve is to shut off the fresh water supply to the buildings' plumbing devices while the sewer line is blocked in. This valve is often located on the building fresh water supply line (FIG. 1, 140) above grade in the building. "Above grade" is defined to mean at or above the surface of the ground, or ground level. This valve operates opened and fails closed. The purpose of the valve is to prevent water from entering a blocked sewer line and causing an overflow of plumbing devices, e.g., toilets and lavatories. The control valve can also serve as protection from a contaminated water source by the AHJ at the facility's water location or be incorporated into the city's main header system.

4. System Controller (FIG. 1, 110): This is a programmable logic microprocessor located in a protective enclosure in the building usually above the base flood elevation (BFE). The controller sends a digital or analog signal to the control valves based on the inputs from local level transmitter (100, 200) or remote command, indicates valve positions (open/closed), and sends alarms to local and or remote monitoring stations.

5. Transmitter/Receiver (FIG. 2, 200, 210): This device communicates with the system supervisory location via the internet, telemetry, cellular networks or other means and indicates the status of the system, sends output, receives input from proximity positions from the sewer control valve. The device can be located at a central control, i.e., a governmental office, service provider office, or owner's property for example.

Gas Valve/Electrical Contactor (136, 185)

An embodiment involves a bi-directional valve to isolate the gas service and a switching relay (electrical contactor) for the main power to the inventive system. The switching relay contactor and the gas isolation valve can be operated remotely like the sewer and water isolation valves. The electrical switching relay contactor can be located at the power pole or at the facility's meter. As an option to minimize costs, the user can switch off multiple facilities in a given area, and the switching relay could be on the secondary side of the transformer that services those electrical facilities.

The inventive system can be operated by either pneumatically or by electric sources: each type would need their respective disconnect valves or devices. The electrical systems could be isolated for the ground floors at the property while keeping power on in the second, third or higher level floors of the facility. This also prevents the electric providing source (such as an electric company) from interfering with the inventive system. The inventive system would include electrical disconnects to lower floors, as well as emergency egress lighting with batteries, or back up power, at the lower floor(s). Gas line isolation to the property is also an option which can be established.

An embodiment of the inventive system includes additional features such as the SCADA system previously mentioned, as well as multimedia indications of geographical water levels and valve position indicators, affected districts, water quality activation alerts, emergency notifications, electrical and fire hazard assistance to emergency responders such as emergency medical staff (EMS) and the like. Each level indicating controller station (110) comprises at least a local operator interface, alarm indicators, on-off button, manual by-pass buttons or switches, and audible alarm. These individual items are standard and not shown, but known well to those of skill in the art. The inventive systems' logic controller comprises the following functionality.

Functional Descriptions:

Power Off Mode

When the system is in POWERED OFF mode, the controller (FIG. 2, 100) shall: power off the local Controller Display; will turn off the System LED Indicator; the system will go to fail position, and close the Sewer Isolation Valve, and also close the Domestic Water Isolation Valve.

Power on Mode

When the system is in POWERED ON mode, the controller (FIG. 2, 100) will complete a self-diagnostic test and the Controller shall: power the local Controller Display (not shown); the Controller shall turn on the System Power LED Indicator (not shown), and should the systems fail its self-diagnostics test, the systems will turn on its audible alarm and System Trouble LED Indicator (not shown) to provide warning to users of the failed state.

Normal/Automatic Mode

When the system is in AUTOMATIC control mode, the controller will continuously monitor for flood levels. Should the controller receive a high flood water level signal, also described herein as the high level setpoint water level, from a local level transmitter or via a radio or broad band signal, the system will automatically close the bi-directional valve and isolate the sewer system and the domestic water supply to the lavatory (and water closet) and set off an alarm notifying the occupants that the water closet and lavatory is out of service. A high flood water level signal shall be set at least at 3" (inches) below the floor drain elevation or as defined by the Authority Having Jurisdiction, (AHJ). This high flood water level signal is considered the high level setpoint value. High level setpoint and high water level as well as flood waters are used interchangeably here. Once these events occur, the controller initiates a sewer system isolation sequence as follows: Close Sewer Isolation Valve; Close Domestic Water Isolation Valve; Turn on System LED alarm indicating high flood water levels; Turn on System LED Alarm indicating valve closure after the valves are confirmed Closed; and, Turn on System Audible Alarm. The Alarm maybe acknowledged by user by for example, pressing "Acknowledge Button".

Return to Normal Level

The Controller continuously monitors the flood water level and automatically returns the system to NORMAL when flood water levels are below an acceptable level for more than 60 minutes. This NORMAL setting is considered the water level below the high setpoint water value. Acceptable levels is generally about 6" (inches) below the floor drain elevation or as defined by the Authority Have Jurisdiction, (AHJ) but can be less than 6" down to about 2"-3" below the floor drain elevation. The Acceptable range level may be modified according to local standards and definitions by the AHJ over building codes. The Controller initiates a sewer system return to normal sequence as follows: Open Sewer Isolation Valve. Open Domestic Water Isolation Valve; Turn off Systems Alarm Indicating High Flood Levels; Turn off System Alarm Indicating Valve Closure after valve is confirmed Open; and Turn off System Audible Alarm.

Loss of Level Signal

Should the utility isolation system lose its Level Signal (100) the sewer isolation valve (160) and domestic water isolation valve (145) will automatically close to a Fail-Safe Position. Under this embodiment or condition, a system trouble alarm is initiated to notify the occupants of the current status of the system. Both visual alarm lights and audible alarms are initiated as follows: Close Sewer Isolation Valve; Close Domestic Water Isolation Valve; Turn on System LED Alarm Indicating Loss of Signal; Turn on System LED Alarm Indicating Valve Closure after valve is confirmed Closed.; and Turn on System Audible Alarm.

Loss of Power/System Off

Should the utility isolation system lose its Normal and Battery Backup power, the sewer isolation valve (160) and domestic water isolation valve (145) will automatically close to a Fail-Safe Position. A system trouble alarm will be initiated, generally by an alternate power supply source such as solar battery, or gas powered back up source or the like, to notify the occupants of the current status of the system. Both visual alarm lights and audible alarms will be initiated for each type of alarm. The sequence of events is as follows: Close Sewer Isolation Valve, and Close Domestic Water Isolation Valve, and activate audible alarm for notice to occupants.

Temporary Manual By-Pass

When the system is in MANUAL BY-PASS control, the controller will bypass the level and remote signal and the sewer isolation valve and domestic water isolation valve will be opened. It will also notify the occupants that the lavatory isolation systems is in MANUAL—BYPASS MODE. The controller will activate an LED Alarm and Audible Alarm that it is in MANUAL—BYPASS MODE. This mode will be active for a duration of time, generally about 1-4 hours (duration determined and set by user or AHJ) after which the controller will return to AUTOMATIC MODE. The owner may re-initiate the MANUAL-BY PASS mode for an additional 1-4 hour period or return the controller to AUTOMATIC or OFF Control Mode. The sequence of events occur as follow: Open Sewer Isolation Valve; Open Water Isolation Valve; Turn on Systems Alarm Indicating By-Pass Mode; and, Turn on System Audible Alarm.

Manual Isolation Valve Operation

The sewer isolation valve and domestic water isolation valve shall have a local manual operation. Should either valve be opened or closed manually, the controller shall: Turn on the Systems Alarm Indicating Valve in Manual Open Position; Turn on the System Audible Alarm; Turn on notification to AHJ that system is in Manual mode (if applicable or desired by user).

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of example only, and is not intended to limit the invention.

The invention claimed is:

1. A sewer isolation system for isolating sewer line services to a facility under high water conditions, and said facility also having a domestic water line service and one floor at ground level, said system comprising:
 a. a sewer line and a domestic water supply line;
 b. a level transmitter,
 c. a level indicating controller station,
 d. a bi-directional sewer control valve connected to the sewer line and a domestic water supply valve connected to the domestic water supply line respectively,
 e. a control panel,
 f. wherein the level transmitter is installed over a body of water that is capable of transmitting a level of the body of water signal to the level indicating controller station, said level indicating controller station further comprising a predetermined setpoint, at least one means to send actuation signal to the bi-directional sewer control valve and the domestic water supply valve, which bi-directional sewer control valve and domestic water supply valve are capable of actuation and shall remain open when the level of the body of water signal is below the predetermined setpoint;
 g. upon the level of the body of water signal reaching above the setpoint, the bi-directional sewer control valve and the domestic water supply valve are is closed thus isolating the sewer line and isolating the domestic water supply line service to the facility and having a closed sewer line and closed water supply line;
 h. upon return of the level of the body of water signal below the setpoint, the bi-directional sewer control valve and the domestic water supply control valve will open, thus removing the isolation of the domestic water line and sewer line.

2. The isolation system of claim 1 wherein the closed sewer line prevents ingress of floodwaters.

3. The isolation system of claim 1 wherein the closed sewer line prevents backflow of sewage into the facility.

4. The isolation system of claim 1 comprising an automatic local actuation unit.

5. The isolation system of claim 1 comprising a automatic remote actuation unit.

6. The isolation system of claim 1 comprising a manual local actuation unit.

7. The isolation system of claim 1 wherein the bi-directional sewer control valve, and the level transmitter are below base flood elevation level of the facility.

8. The isolation system of claim 1 wherein the domestic water supply valve is above base flood elevation level of the facility.

9. The isolation system of claim 1 wherein the predetermined setpoint for the level of the body of water is greater than about 3" below the ground level floor of the facility.

10. The isolation system of claim 9 wherein the level of the body of water below the predetermined setpoint is about 3.1" to about 24" below the ground floor of the facility.

* * * * *